Sept. 10, 1946.   A. L. SIMISON ET AL   2,407,295
APPARATUS FOR PRODUCING FIBROUS GLASS
Filed March 26, 1942   2 Sheets-Sheet 1
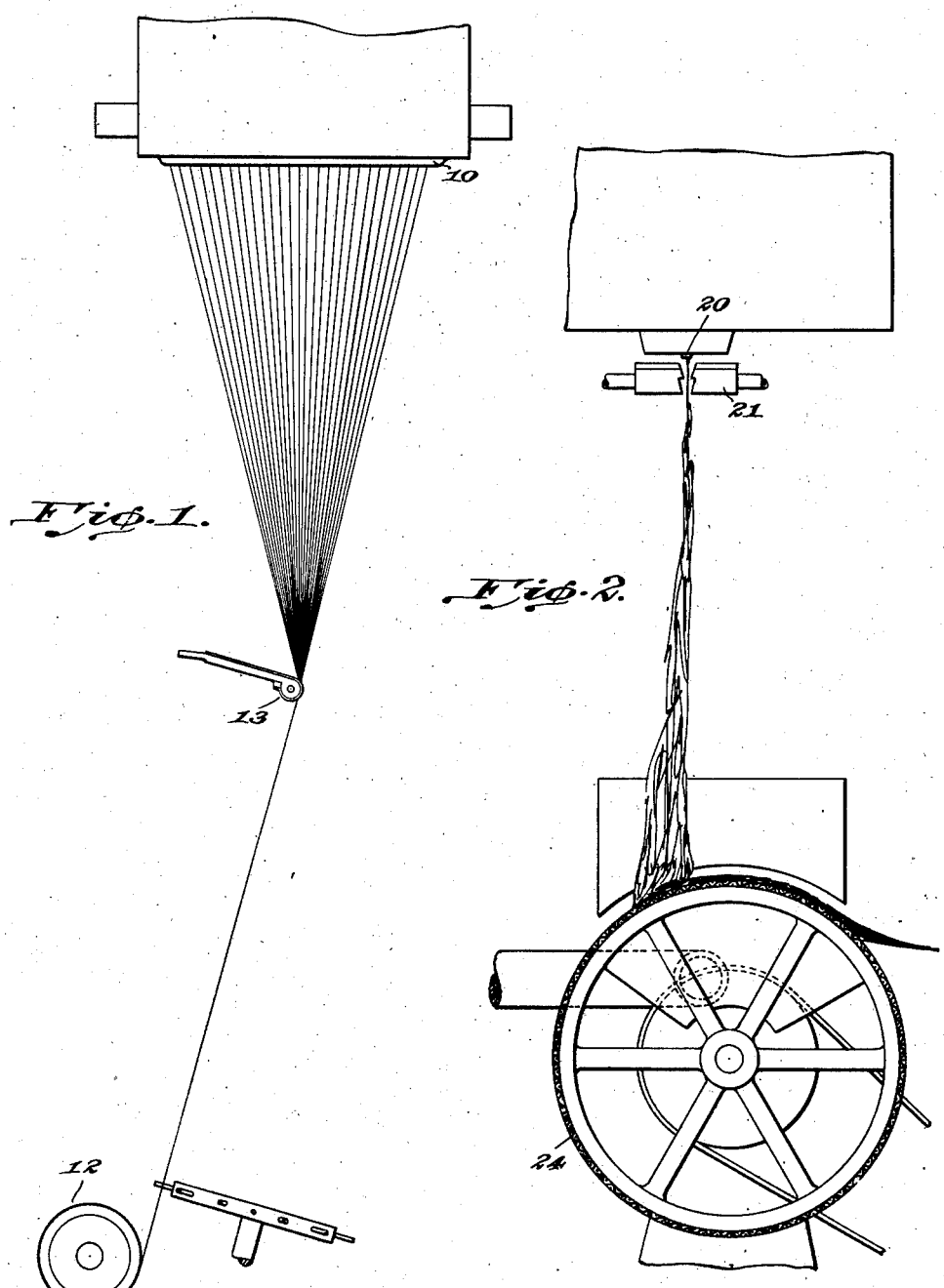
INVENTORS
Allen L. Simison and
Ed Fletcher
BY
ATTORNEY Sept. 10, 1946.   A. L. SIMISON ET AL   2,407,295
APPARATUS FOR PRODUCING FIBROUS GLASS
Filed March 26, 1942   2 Sheets-Sheet 2
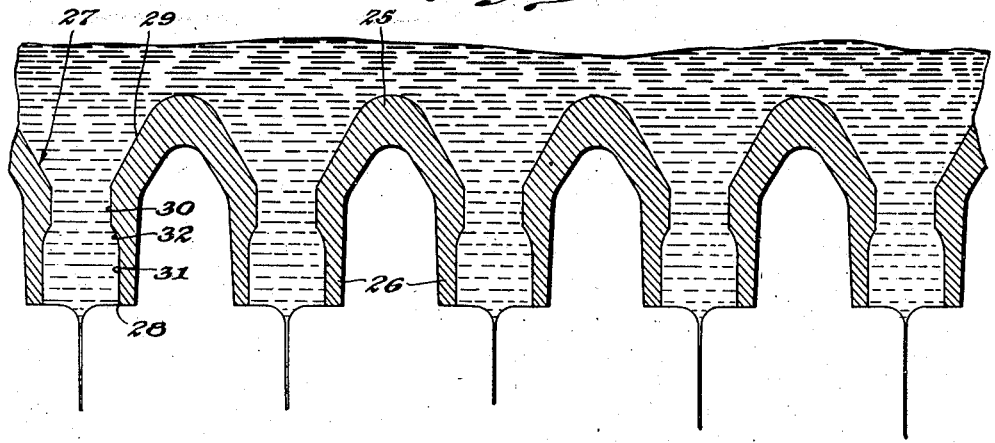
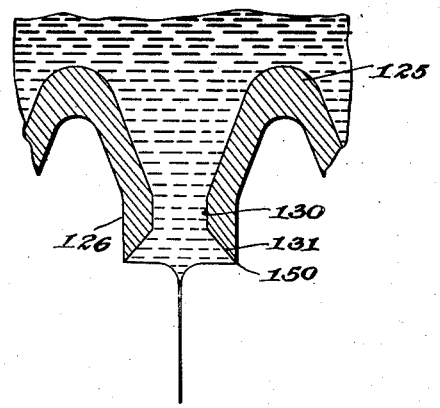
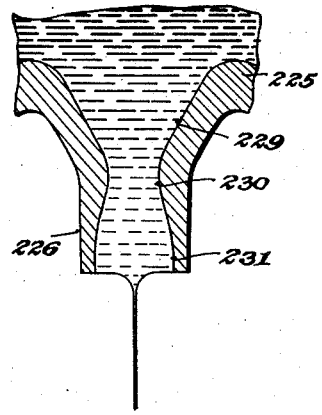
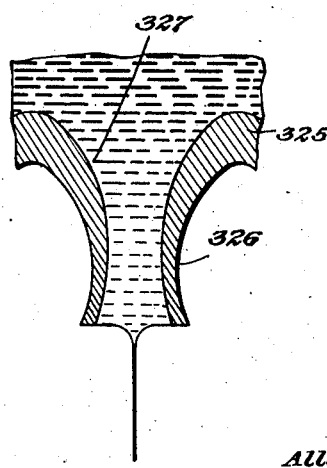
INVENTORS
Allen L. Simison and
Ed Fletcher
BY
ATTORNEY Patented Sept. 10, 1946

2,407,295

UNITED STATES PATENT OFFICE 2,407,295

APPARATUS FOR PRODUCING FIBROUS GLASS

Allen L. Simison and Ed Fletcher, Newark, Ohio, assignors to Owens-Corning Fiberglas Corporation, Toledo, Ohio, a corporation of Delaware Application March 26, 1942, Serial No. 436,236

9 Claims. (Cl. 49—55)

This invention relates to the manufacture of glass filaments and more particularly to improved apparatus for feeding molten glass or similar heat-plasticized material in the attenuation of filaments.

In the manufacture of glass filaments glass making materials are melted in a container or receptacle conventionally in the form of a trough having metal walls and bottom and provided in its bottom wall with an orifice or orifices from which the glass flows in the form of fine streams.

In the production of glass filaments by attenuating a stream of molten glass flowing through a small orifice in a molten glass container, as shown in United States Patent No. 2,291,289 of July 28, 1942 to Slayter and Thomas, it is desirable to have accurate control of the temperature of the glass in the region of attenuation. This is true whether the attenuation is effected mechanically, for instance, by employing a rotating drum to attenuate the filaments and on which the filaments are wound, or whether the streams are attenuated by tractively engaging them with a gaseous blast moving in the direction of stream flow. Attenuation of glass filaments by mechanical means in the form of a winding drum is described in the United States Slayter and Thomas Patent No. 2,234,986 of March 18, 1941 and by mechanical means in the form of coacting gear-shaped rotors in the United States Slayter Patent No. 2,230,272 of February 4, 1941. The Slayter and Thomas Patent No. 2,133,236 of October 11, 1938 describes the process of attenuating glass filaments or fibers by a gaseous blast.

In order to rapidly produce fine fibers of regulable uniform diameter, the temperature of the glass should be accurately controlled during its passage from the supply body to the point where the fibers may be said to be completely formed. If attenuation takes place at too low a temperature the fibers are coarse and uneven on their surfaces. The resistance to attenuation of glass at low temperature requires greater pulling force and consequently the consumption of more power, and resulting, in the case of attenuation by means of a drum, in such tight packing of the strands on the drum as to interfere with their later removal. On the other hand, glass at too high a temperature is so watery and fluid as to preclude attenuation. Constant temperatures are also necessary to obtain uniformity of the product.

The supply body of glass is preferably maintained at a temperature higher than the desired attenuating temperature to facilitate complete solution of the ingredients of the glass and eliminate all striae, cords and orientations of ingredients. For many glass batches the desired attenuating temperature is relatively near and either above or below the devitrification point of the glass. Holding the entire supply body at the attenuating temperature or cooling it slowly from a higher temperature to the attenuating temperature entails the danger of devitrification. If, however, the supply body is held at a temperature well above the devitrification temperature and then at the orifice reduced quickly to the attenuating temperature, devitirification is prevented.

It is an object of the present invention to provide apparatus for obtaining accurate temperature control of the molten glass in the attenuating zone and to assure rapid reduction of the temperature of the glass in the neighborhood of this zone to the desired attenuating temperature. It is an ancillary object to cause the temperature of the glass in the region of attenuation to be dependent mainly upon the temperature of the supply body and upon stable fixed factors and not upon applied cooling means, thereby permitting regulation of the viscosity of the glass being attenuated merely by regulating the temperature of the supply body.

It is a further object of the invention to cause the reduction in temperature at a point close to the point of attenuation. The rapid reduction of temperature in the neighborhood of attenuation permits holding only a minimum quantity of glass at the attenuating temperature, thereby eliminating the danger of incipient devitrification.

It is highly desirable in the interest of greater and more economical production to maintain the viscosity of the glass being attenuated sufficiently low so that only a minimum tension is required to attenuate each filament. However, in the case where the molten glass flows from metal-walled orifices, the glass at this low viscosity wets the metal and flows over the outside wall of the bushing, flooding the orifice and interrupting attenuation therefrom. The molten glass eventually spreads to adjoining orifices and floods them in turn so that within a short time the operation must be halted and the bushing cleaned. If the metal about the orifice is maintained sufficiently cool to prevent flooding, it has been discovered that in prior bushings the glass flowing through the orifice passage was of such a high viscosity that the attenuating force necessary was unduly increased.

It is a further object of the present invention to obtain both of the above desired properties simultaneously. The glass being attenuated is of sufficiently low viscosity to permit attenuation with a minimum attenuating force and the metal surrounding the orifice is sufficiently cool to prevent wetting thereof by the molten glass, thereby eliminating flooding.

It is also an object of the present invention to reduce the resistance to flow of the molten glass through the orifice passage as its viscosity increases to the desired attenuating viscosity so that the glass may be cooled sufficiently to be properly attenuated and to prevent flooding of the orifice without unduly increasing the resistance to movement of the glass through the orifice passage. More particularly, it is an object to reduce the rate of flow of the molten glass as its viscosity increases. Since the viscous resistance of a liquid is directly proportional to the rate of movement thereof, a reduction in the rate of flow of the molten glass lessens the effect of increased viscosity.

It is a still further object of the invention to provide a glass feeding orifice from which the glass will flow under the action of gravity when attenuation is interrupted although the orifice is of small size and the viscosity of the glass is sufficiently high to prevent wetting of the outer metal walls of the orifice. This provides for automatic starting of stream flow.

Other objects, as well as advantages, of the present invention will be apparent from the following description.

In the drawings:

Figure 1 is a schematic elevational view of apparatus for the production of continuous filaments by mechanical attenuation;

Figure 2 is a schematic elevational view of apparatus for attenuating the filaments by means of a gaseous blast;

Figure 3 is a longitudinal vertical section of the bushing of the present invention on a greatly enlarged scale and partly broken away;

Figure 4 is a sectional view on a like scale of a bushing tip illustrating a modified form; and Figures 5 and 6 are similar views illustrating further modifications.

The present invention provides an improvement of the conventional glass melting unit or feeder that is in the form of a receptacle or container for the molten glass and having orifices in a wall thereof through which the glass flows in the form of fine streams. The construction of the container is such that difficulties heretofore encountered are eliminated. More particularly the feeder itself is of conventional form having side walls preferably of metal, and a metallic bottom wall provided with tips or nipples having passages for the molten glass extending centrally therethrough. In the present case the passages are provided at their outer ends with enlargements which cooperate with a novel construction of the walls of the tips to control the temperature, viscosity and rate of flow of the glass to assure uninterrupted efficient operation of the apparatus.

Referring to Figure 1 of the drawings, a container or receptacle 10 for holding a supply of molten glass, called a bushing, is provided for feeding molten glass in a multiplicity of small streams from its bottom wall. Glass already molten may be fed into the upper end of the bushing, or cullet or raw batch may be fed thereinto and melted in the bushing. The bushing is formed of a heat resistant precious metal or precious metal alloy and is heated by passing an electric current through its walls.

The small streams of molten glass flowing through openings in the bottom of the bushing may be attenuated into filaments by means of a revolving spool or drum 12 upon which the filaments are wound to form a package. Intermediate the drum and the bushing the filaments pass over a pad 13 which is arranged to group the filaments into a strand and to apply a suitable lubricant or sizing to the filaments. The pad may be of any suitable type such, for instance, as that shown and described in the Fisher Patent No. 2,224,149.

Figure 2 illustrates apparatus for attenuating glass fibers by means of a gaseous blast. This apparatus may include a bushing 20 similar to the bushing 10 and heated in like manner.

Spaced beneath the bottom of the bushing 20 is a blower 21 provided with oppositely disposed series of jets for directing converging gaseous blasts onto the streams of molten glass flowing from the bushing to attenuate the streams into fibers. The Slayter and Thomas Patent No. 2,133,236 more fully discloses this method of producing glass fibers. The fibers, after they are formed, may be deposited on a moving foraminous surface 24 spaced a suitable distance beneath the blower.

The bushings 10 and 20 are each provided on their bottom wall 25 with a plurality of tips 26 projecting outwardly a substantial distance therefrom. Each of the tips has a passage 27 extending therethrough communicating at its inner end with the interior of the bushing and opening to the atmosphere at its outer end 28. The inner end of the passage 27 is preferably gradually converging in cross-section as shown at 29 so that the molten glass is inducted in a smooth streamline flow into the passage. The converging portion of the passage directly communicates with a straight portion 30 which in turn is in communication with a straight sided enlarged passage 31. At its point of meeting with the passage 30, the passage 31 is preferably rounded as at 32 to permit the glass to flow into the larger passage without the formation of eddy currents and to eliminate any pockets where the glass may be quiescent.

The walls surrounding each passage 27 preferably gradually decrease in thickness from the bottom 25 of the bushing to the point where the passages 30 and 31 join. At this point the wall is abruptly reduced in thickness and then again gradually decreases in thickness from the rounded portion 32 to the outer end 28 of the tip.

This tapering cross-section of the wall facilitates gradual cooling of the molten glass flowing through the passage in two ways. It lessens the amount of heat conducted by the walls from the bushing to the end 28 of the tip or nipple and also, by virtue of the thinner wall adjacent the end 28, the rate of dissipation of heat from the molten glass as the glass approaches the lower end of the passage is increased.

The molten glass in the bushing is preferably at a temperature several hundred degrees above the attenuating temperature and flows into the passage 27 and begins to cool as it moves away from the bottom of the bushing. It cools but a small amount, however, by the time it reaches the passage 30 so that it flows through said passage at a viscosity lower than the attenuating viscosity. As the molten glass flows into the enlarged passage 31, its rate of cooling is accelerated because of the fact that here the wall of the tip is abruptly reduced in thickness and also because the enlarged passage 31 slows down the rate of flow of the molten glass to increase the rate of cooling. As the molten glass continues its movement through the passage 31 it continues to cool at the increased rate so that by the time it reaches the lower end of the tip it is at the desired attenuating temperature and proper viscosity. The rate of cooling of the glass as it moves through the passage 31 is greater than the rate of cooling in the passage 30 so that the glass is rapidly cooled in the neighborhood of the devitrification point to minimize the danger of devitrification.

The enlarged passage 31 serves a further purpose in that the body of molten glass therein constitutes a reservoir of molten material so that upon slight momentary fluctuations in operating conditions, the attenuation will not be disrupted. Thus, an instantaneous chilling of the tip will not affect the relatively larger body of glass in the passage 31 sufficiently to stop attenuation. Also, localized bodies of glass at higher temperatures flowing into the larger passage 31 will be, to a large extent, equalized.

Although the manner in which the tip of the present invention acts to minimize the attenuating force required and at the same time prevent flooding of the bushing tips is not completely understood, it may be that the enlarged passage 31 permits a differential in temperature between the central portion of the molten glass in the passage 31 and the outer portion of such glass adjacent the wall of the passage. Thus the glass toward the center is of a sufficiently low viscosity to require only a minimum of tension to attenuate it while the glass adjacent the wall of the passage and the metal of the wall are at sufficiently low temperatures to prevent the glass from wetting the metal and flooding the tip. A straight passage does not provide the same results, which may be due to the fact that a straight passage of sufficient diameter to provide the required temperature gradient transverse to the direction of flow of glass permits too great a flow of glass, so that regulation of attenuation is difficult and the increased quantities of glass tend to flood the orifice. If the glass in a straight passage is maintained at a temperature sufficiently low to reduce the flow, then it is found that the required attenuating force is unduly increased. In the present case, the narrow passage 30 controls the rate of flow of the molten glass while at a high temperature and the increase in viscosity of the glass to attenuating viscosity takes place in the enlarged passage 31. The present invention realizes both a minimum attenuating force and a complete freedom from flooding.

It has been discovered that for a given temperature the filaments attenuated from the molten glass flowing through the tips vary in size with the rate of attenuation. At normal operating temperatures the relation of speed of attenuation to the size of filament attenuated is such that the quantity of glass pulled always remains substantially the same. This does not always hold true at lower temperatures where sometimes increase in the pulling rate may actually cause an increase in the amount of glass pulled and result in coarser fibers. However, at higher temperatures, the higher the rate of pull, the smaller is the resulting filament.

We have found that because of this the passage 30 in the tip, which controls to large extent the rate of flow of molten glass through the tip, may, if desired, be of the same size regardless of the size of filament being attenuated within reasonable limits and the desired regulations of filament size may be effected solely by varying the speed of attenuation. However, to prevent going to inefficient very low speeds, it is desirable to increase the diameter of the passage 30 for the production of larger size filaments. The size of the passage 31 may remain substantially the same, the only difference in operation being that the slightly larger passage 30 permits a higher rate of flow of molten glass into the passage 31 with a consequent greater amount of glass going into the filament.

The length of the passage 30 also governs the rate of flow of the molten glass and it must be proportioned to obtain the proper rate of flow, variations in its length perceptibly affecting the rate of flow of the viscous glass therethrough. The enlarged passage 31 is of a diameter and length so proportioned as to provide the desired temperature drop of the molten glass flowing therethrough and to hold a proper quantity of molten glass.

With bushing orifice passages heretofore employed cessation of attenuation of the stream flowing from the orifice caused the glass therein to stop flowing, apparently because the glass at the lower end of the orifice was quickly cooled by the metal walls when it ceased to be drawn out by the attenuating force. The glass at the end of the orifice was thus too cool and viscous to drop from the orifice under the action of gravity. Operation could be started again only by initiating flow from each orifice by means of a pick. This was a time-consuming operation and greatly reduced the efficiency of the operation.

The orifice passage of the present invention overcomes this difficulty by causing automatic starting of the flow of molten glass upon interruption of attenuation. As the stream flows from the orifice it need only be directed to the attenuating means and the operation resumed.

This effect of the present orifice passage is believed due to the fact that the lower passage of increased diameter results in a higher temperature gradient of the molten glass lengthwise of the passage. Upon interruption of attenuation and cooling of the molten glass at the lower end of the passage, flow ceases, but the heat of the glass in the narrow passage directly above the enlarged passage is quickly communicated to the glass at the lower end of the orifice passage and flow of the glass is automatically resumed.

The modified form of tip illustrated in Figure 4 employs a passage 130 ending in an enlarged passage 131 at its lower end of frusto-conical form, the lower end of said passage forming a sharp edge 150 with the outer wall of the tip. This modified form of passage operates in a manner similar to the preferred form of the invention to accurately control the temperature and viscosity of the molten glass therein and prevent flooding of the tip.

The modified form illustrated in Figure 5 is similar to the preferred form of the invention except that the passage 229, the passage 230 and the passage 231 merge into each other more gradually and the entire passage in the tip has a smoothly curved interior wall.

Figure 6 illustrates a modification operative to obtain the more important objects of the present invention and which lends itself to being formed by a simple die operation. With this form the tip may be formed first with straight sides and then a wedge forced into the outer end of the tip to flare the walls of the tip and provide the illustrated diverging contour of the passage 327.

The present invention has the advantage that it accurately controls the temperature of the molten glass to permit efficient attenuation and prevents flooding of the tips without the need for exterior cooling means such as a draft of air directed toward and impinging upon the tips. Because of this, the tips may be more closely spaced and the bushing may be provided with many more orifices in any desired grouping or arrangement.

Various modifications may be resorted to within the spirit and scope of the appended claims.

We claim:

1. Glass fiber forming apparatus by which streams of molten glass are attenuated into fine fibers, comprising a receptacle for the molten glass provided with a metallic bottom, nipples projecting downwardly from said bottom and having metallic walls integral with said bottom to permit heat to flow from said bottom into the walls of said nipples, and a passage extending through each of said nipples and communicating with the interior of said receptacle at its upper end and opening at its lower end to the atmosphere, a straight-sided channel in said passage intermediate the ends thereof, and a second channel greater in cross-sectional area than said first-named channel and connecting said first-named channel with the lower end of said nipple.

2. Glass fiber forming apparatus by which streams of molten glass are attenuated into fine fibers, comprising a receptacle for the molten glass provided with a bottom wall, nipples projecting downwardly from said bottom wall, an orifice passage extending through each of said nipples and communicating with the interior of said receptacle at its upper end and opening at its lower end to the atmosphere, said passage being formed at its upper end with an inwardly and downwardly tapering portion, said tapering portion opening at its lower end into a substantially straight-sided channel, and an outlet portion of said orifice passage greater in cross-sectional area than said straight-sided channel and located beneath said straight-sided channel and terminating at the lower end of said nipple.

3. A container for molten glass for feeding the glass in a small stream to be attenuated into a fiber, having a metallic bottom wall and a feeding passage in the bottom wall in the form of a hollow nipple integral with said bottom and opening at its outer end to the atmosphere, said passage being so proportioned as to feed the molten glass at the rate at which it is formed into fibers, and a channel in said nipple at the outlet end of said passage of greater cross-sectional area than said passage, the lower portion of said nipple in the region of said channel having a reduced wall thickness.

4. In apparatus for forming glass fibers including means for attenuating streams of molten glass to filamentous form comprising, a container for molten glass having a metal nipple projecting outwardly from a wall thereof, an orifice passage extending centrally through said nipple and communicating at its inner end with the interior of the container and opening at its outer end to the atmosphere, a straight-sided channel in said passage disposed substantially medially of its length, the thickness of the wall of said nipple surrounding said passage decreasing progressively in the direction of flow of glass through said orifice passage, whereby a stream of molten glass of controlled viscosity is flowed from the supply of glass in the container.

5. In apparatus for forming glass fibers including means for attenuating streams of molten glass to filamentous form, comprising, a container for molten glass having a metal nipple projecting outwardly from a wall thereof, an orifice passage extending centrally through said nipple and communicating at its inner end with the interior of the container and opening at its outer end to the atmosphere, and a straight-sided channel in said passage disposed substantially medially of its length, and a second channel greater in cross-sectional area than said first-named channel and connecting said first-named channel with the outer end of said nipple, the thickness of the wall of said nipple surrounding said passage decreasing progressively in the direction of flow of glass through said orifice passage throughout the combined lengths of both said channels, whereby a stream of molten glass of controlled viscosity is flowed from the supply of glass in the container.

6. In apparatus for forming glass fibers including means for attenuating streams of molten glass to filamentous form comprising, a container for molten glass having a metal nipple projecting downwardly from the bottom wall thereof, an orifice passage extending centrally through said nipple and communicating at its upper end with the interior of the container and opening at its lower end to the atmosphere to flow a stream of molten glass from the supply in the container, said passage through the nipple being formed at its upper end with an inwardly and downwardly tapering portion, said tapering portion opening at its lower end into a substantially straight-sided channel, and an outlet portion of said orifice passage greater in cross-sectional area than said straight-sided channel and terminating at the lower end of said nipple, the wall of said nipple decreasing in thickness progressively throughout the length of said nipple.

7. In apparatus for forming glass fibers, a container for molten glass, a metal nipple projecting downwardly from the bottom wall thereof and arranged to permit the passage of currents of air therearound, said nipple having a passage therethrough communicating with the interior of said container and terminating in a downwardly facing orifice through which the glass is adapted to flow as it is attenuated, said passage formed with a restricted portion substantially medially of its length, the wall of said nipple beneath said restricted portion being of substantially reduced thickness.

8. In apparatus for forming glass fibers by attenuating a stream of molten glass to filamentous form comprising, a container for the molten glass, a metal nipple projecting downwardly from the bottom wall thereof and arranged to permit the passage of currents of air therearound, said nipple having a passage therethrough communicating with the interior of said container and terminating in a downwardly facing orifice through which the glass is adapted to flow as it is attenuated, said passage formed with a restricted portion located below the juncture of said nipple with the bottom wall of the container, and the portion of said passage contiguous to the orifice being provided with a portion of increased cross-sectional area, the wall of said nipple surrounding said passage progressively increasing in thickness in the direction of flow of glass through the passage and abruptly decreasing in thickness at a point below said restricted portion.

9. Glass fiber forming apparatus by which streams of molten glass are attenuated into fine fibers, comprising a receptacle for the molten glass provided with a metallic wall, nipples projecting from said wall and having metallic sides connected in heat-conducting relation with said wall to permit heat to flow from said wall into the sides of said nipples, and a passage extending through each of said nipples and communicating at its inner end with the interior of said receptacle and opening at its outer end to the atmosphere, the walls of said passage decreasing in thickness at the outer end of the nipple.

ALLEN L. SIMISON.
ED FLETCHER.